March 14, 1967  N. J. PILGER  3,309,005
EASY OPENING CARTON CONSTRUCTION
Filed June 17, 1965  3 Sheets-Sheet 1
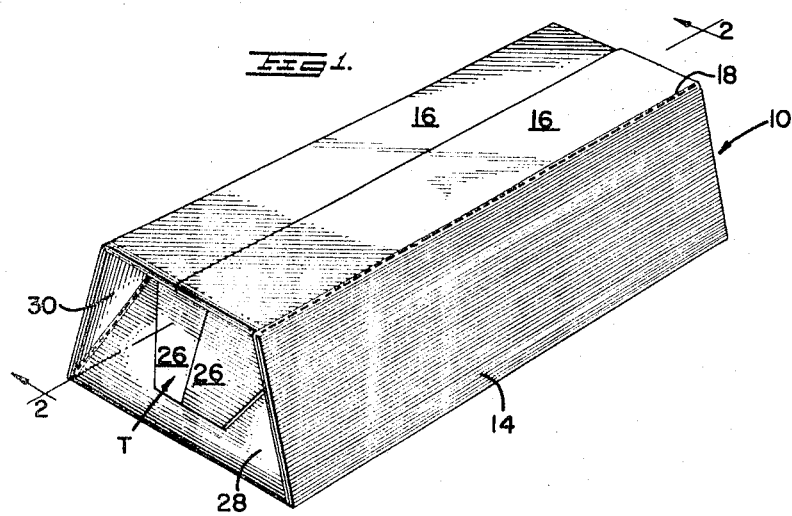
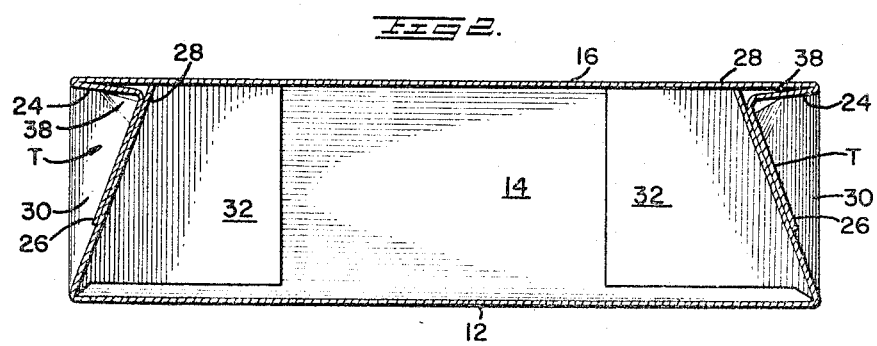
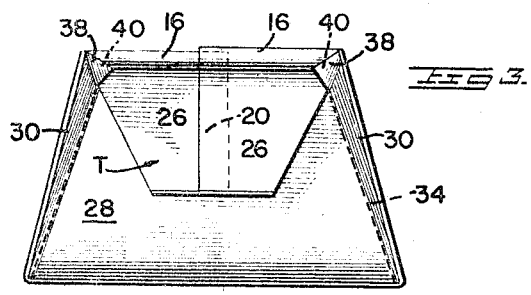
INVENTOR
NICHOLAS J. PILGER
BY *Glenn, Palmer & Matthews*
ATTORNEYS

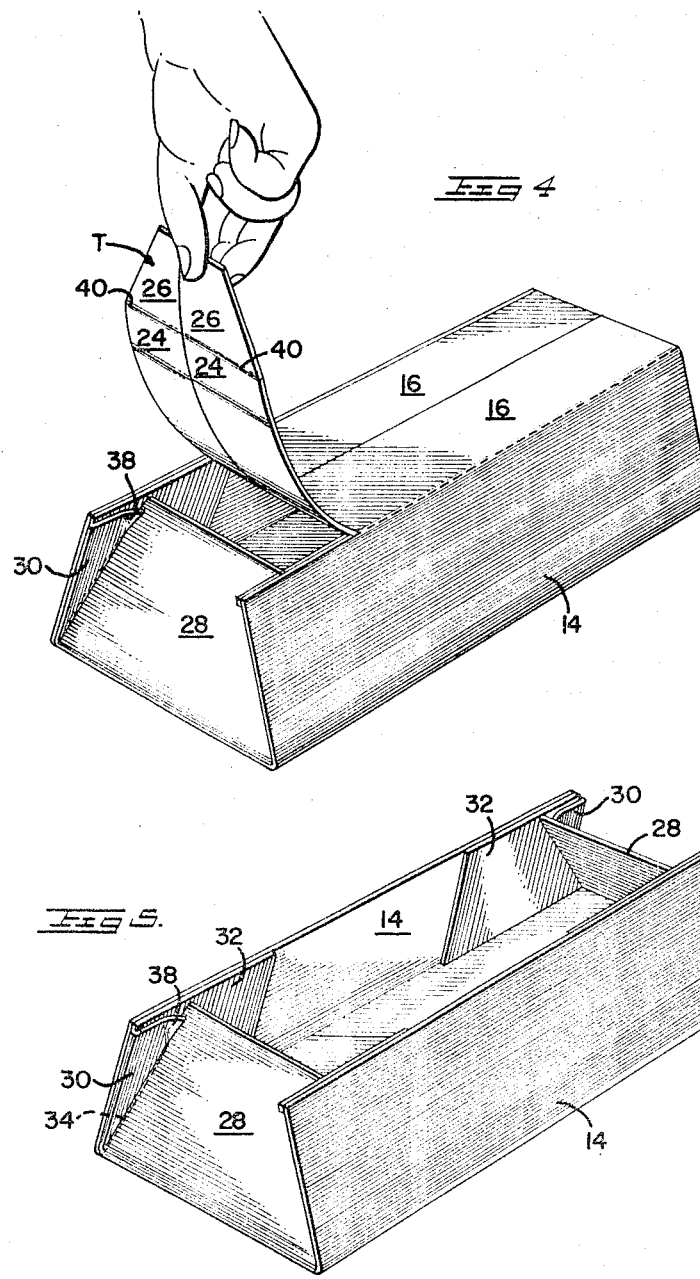

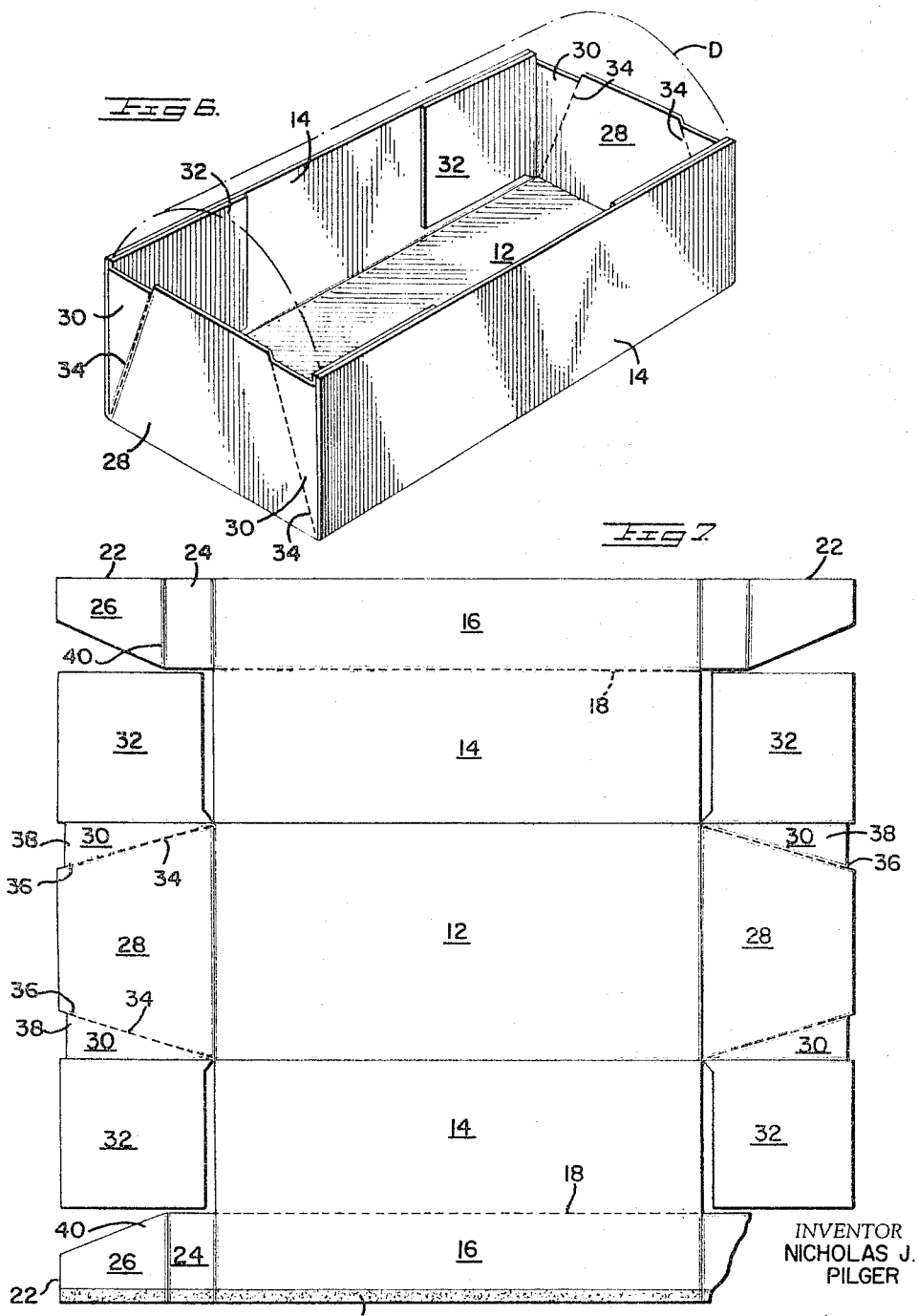

United States Patent Office 3,309,005
Patented Mar. 14, 1967

3,309,005
EASY OPENING CARTON CONSTRUCTION
Nicholas J. Pilger, Thousand Oaks, Calif., assignor to Reynolds Metals Company, Richmond, Va., a corporation of Virginia
Filed June 17, 1965, Ser. No. 464,619
8 Claims. (Cl. 229—51)

This invention relates to a novel carton construction, and more particularly related to an expandible, easily openable carton for frozen bakery products and the like, which may be used during heating of the contents, and which provides rapid and easy access to the contents thereof, and wherein also the opening means is protected from inadvertent opening prior to its intended use.

The invention finds particular use with products such as frozen bread dough or the like, wherein after initial opening thereof as by removal of the top closure panel, the bread dough or other comestible may be heated, allowed to raise, and then baked within the carton, and wherein the carton construction permits limited expansion thereof to accommodate the bakery product, after which the carton may be easily stripped from the bread for subsequent serving thereof.

It is therefore one object of my invention to provide a carton which has an easily releasable means for effecting opening thereof, yet wherein the opening means is protected from inadvertent detachment prior to use.

It is a further object of my invention to provide a carton which, when used with bakery goods which normally expand upon raising, permits expansion of such product while still retaining the product therewithin during the raising, oven heating, or the like.

It is another object of my invention to provide a carton which may be readily stripped from the product therewithin to permit easy removal thereof from the carton.

It is a further object of my invention to provide a carton having a novel end construction which not only affords easy-opening thereof, but also provides a tight closure for preventing possible contamination of the contents.

It is another object of my invention, through the tapered sidewall design, to limit the movement of the frozen dough in carton prior opening of the carton thus preventing internal shifting of the product which could result in a lopsided or uneven stacking of the package and/or damage to the carton itself.

Other objects and advantages of my invention will be readily apparent from the following detailed description taken in connection with the accompanying drawings, in which:

FIGURE 1 is a perspective view of the carton of my invention showing the same fully closed.

FIGURE 2 is a sectional view along the lines 2—2 of FIGURE 1, the carton being shown without contents to clarify illustration of the carton construction.

FIGURE 3 is an end view of the carton of FIGURE 1.

FIGURE 4 is a perspective view illustrating initial opening of the carton by grasping and pulling the lift tongue.

FIGURE 5 is a perspective view showing the top panel fully removed at the completion of the opening action shown in FIGURE 4.

FIGURE 6 is a perspective view of the carton with the top panel removed, wherein also the carton body is expanded as may occur upon expansion of raised or heated bakery products therein, shown diagrammatically in dashed lines.

FIGURE 7 is a plan view of the blank from which the instant carton is formed.

Referring to the drawings, the fully closed carton 10 as seen in FIGURES 1 and 3 is elongated and possesses a trapezoidal transverse configuration. The carton is formed from conventional carton stock, and for use with products having a semi-solid component such as icing, grease, etc., the stock is preferably a foil-paper laminate or similar leakproof material.

As particularly seen in the plan view of the blank in FIGURE 7, the carton includes a bottom panel 12 having integrally formed side panels 14, 14. The opposite edges of side panels 14, 14 merge into top portions 16, 16 connected to the side panels 14 along a score line or line of perforations 18. In the erected and assembled carton, the top flap portions 16 are slightly overlapped medially of the carton longitudinal centerline as seen in FIGURE 3, and are secured together along their entire length by means of a suitable adhesive 20 (FIGURE 7).

Extending from each end of the top flap portion 16 and provided with a like glue strip, are similar oppositely projecting flap portions 22. As will become more fully apparent hereinafter, the resultant composite lift tongue T formed from flap portions 22, 22 includes an underfolded portion 24 (FIGURE 2) and a terminal portion 26 connected by fold lines to each other and to the top panel 16.

Projecting from the opposite ends of bottom panel 12 are generally trapezoidal end panels 28. Connected by a line of perforations 34 on each side of end panel 28 is a narrow triangular flap 30, is being noted that the extremity of each end panel 28 projects outwardly slightly beyond the adjacent triangular flaps 30. Integrally connected with each triangular flap 30 along a fold line is a conventional glue flap 32 which is suitably notched along its edge adjacent side panel 14 so as to facilitate infolding thereof as seen in FIGURES 2 and 6 in securing panels 32 to the inner surfaces of side panels 14 in conventional fashion.

It is important to note that the line of perforations 34 between end panels 28 and triangular flaps 30 terminate in short slits 36 at their outermost extremities which extend inwardly therefrom about ⅛″ or 3/16″.

In closing the carton 10, end panels 28 are erected perpendicular to bottom panel 12, much as seen in FIGURE 6, at which time the glue flaps 32 are secured to the inner surfaces of side panels 14. Thereafter, end panels 28 are further folded inwardly to dispose the same in upwardly and inwardly inclined position as seen in FIGURE 2, thereby drawing the side panels 14 into similar converging inclined relationship by virtue of the infolding of triangular panels 20, thereby imparting the trapezoidal transverse configuration to the carton. Thereafter following insertion of the contents, the two flap portions 16, 16 are secured by the adhesive means 20 to form the composite top panel, including the lift tongue T. The tongues T are thence bent downwardly and inwardly as clearly seen in FIGURE 2, to dispose composite flap portion 24, 24 in reversely folded underlying relation to the extremity of the top panel, and lift tongue T in overlying relation to the inclined end wall 28.

In folding the flap portion 22, 22, the respective inner corners thereof at 40 (FIGURES 3 and 7) are hooked behind the terminal corner portions 38 of triangular folded flaps 30, the portions 38 being flexed slightly from the plane of the remainder of the flaps 30 as seen in FIGURES 2 and 3, such flexure being permitted by the slits 36 extending inwardly from the end of the flap. In this manner the lift tongue T at each end of the carton is firmly but releasably retained against the end panel 28 to lock the carton closed. Further, by virtue of the inclined relationship of end panel 28 and the underfolded portions 24, it will be seen that no part of the tongue T projects outwardly of the peripheral outline of the carton, whereby the tongue will not be accidentally dislodged or pre-released.

As is evident from the several figures, the described construction also provides a snug enclosure for the carton contents. As seen in FIGURE 2, the upper extremities of panels 28 bear against the underside of the top panel, which, coupled with the underfolded portions 24 and tongue T, securely close the ends of the carton to insure protection of the contents.

Inasmuch as the tongue T is retained against end panel 28 well inwardly of the extremity thereof, its terminal end may be readily grasped with the fingers and pulled outwardly from the carton as illustrated in FIGURE 4, thereby outwardly flexing the portions 38 of triangular flaps 30 to free the lift tongue whereby the same may be raised and the entire top panel 16 torn from the carton along the score lines 18, 18.

Following removal of the top flap panel at the time of use, the carton with its contents indicated in dashed lines at D, FIGURE 6, such as bakery products requiring raising and heating such as for example bread dough, biscuit dough, cake, etc., will be placed in an oven. Upon raising and/or heating of the product D and expansion thereof, the inclined side and end walls of the carton are free to expand to a fully rectangular position in which the end panels 28 shift from the inclined position of FIGURE 2 to the upright or perpendicular position of FIGURE 6, the triangular panels 39 likewise outfolding into substantially coplanar relationship therewith.

Upon serving the product, the carton is removed from the oven, the contents allowed to cool sufficiently and the side panels 14 with the small triangular flaps 39 attached thereto are pivoted to a flat position in coplanar relation with the bottom panel 12 and the end flaps 28 likewise flattened, the flaps 28 and 30 separating along the perforation lines 34. In this connection it will be observed that the inwardly extending slit at 36 which permits locking of lift tongue T, also facilitates the rupture of the score lines by virtue of the separation thereat extending outwardly to the edge of the blank. With the entire carton thus flattened, the bread or other product may be readily removed therefrom for serving and the carton thrown away. The inner surface may also be coated with a release coating to prevent sticking of the baked product to the carton, if desired.

What is claimed is:
1. An easy-open carton comprising
   a bottom panel merging along one pair of its opposite sides into a pair of upstanding side panels, each said side panel merging in turn into a top closure flap,
   upstanding end panel means connected to said bottom panel at each end thereof and to said side panels thereat, each said end panel engaging beneath said top panel thereby to provide a fully closed carton,
   said top panel having a lift tongue extending from one end thereof and disposed in overlying relation to a said end panel means,
   said end panel means having a portion thereof flexed into overlying relation with said lift tongue inwardly of the terminal end thereof thereby to releasably retain said tongue in overlying relation to said end panel, whereby said lift tongue terminal end is free to be readily grasped for pulling said tongue from its releasably retained overlying relation with said end panel and to tear said top panel from said carton.

2. The carton of claim 1 wherein a central portion of said end panel means inclines upwardly and inwardly from said bottom panel with said top panel overhanging said end panel portion, thereby to dispose said end panel portion within the periphery of said bottom, side and top panels, and wherein said lift tongue includes a first portion disposed in underlying relation to said top panel, and a second portion thereof is in overlying relation to said central portion, thereby to locate said lift tongue entirely within the periphery of said carton top, side and bottom panels to prevent accidental dislodgment thereof.

3. The carton of claim 1 wherein a major portion of said end panel means inclines upwardly and inwardly from said bottom panel thereby to define a recessed end on said carton, and wherein said lift tongue is disposed entirely in said recessed end to prevent accidental release thereof.

4. The carton of claim 1 wherein said top panel is connected to each side panel along a weakened line, thereby to facilitate tear-removal of said top panel from said carton upon pulling said lift tongue.

5. The carton of claim 4 wherein further lines of weakness extending between the top and bottom panels are provided adjacent the corners between each said side and end panel means, whereby subsequent to top panel removal, rupture of said further weakness lines permits the said side panels and end panel means to be laid flat to fully expose the carton contents.

6. The carton of claim 1 wherein said end panel means comprises a central end flap of upwardly narrowing isosceles trapezoid configuration, and a pair of laterally adjacent complementary triangular flaps connected thereto and to said side panels respectively by fold lines, said central end flap inclining upwardly and inwardly of the carton to engage beneath said top panel inwardly of the end thereof, with said triangular flaps infolded along the adjacent side panel to dispose said side panels in upwardly inclined converging relation, thereby to permit outward expanding movement of said side panels when freed from interconnection with said top panel.

7. The carton of claim 6 wherein said lift tongue overlies said central end flap, and a said flexed portion is located on each of said triangular flaps.

8. The carton of claim 6 wherein a line of perforations extends along each said fold line between said central end flap and each said triangular flap, with the upper end of said perforation line terminating in a slit extending to the edge of the fold line, and wherein a said flexed portion is located on each of said triangular flaps adjacent said slit.

References Cited by the Examiner

UNITED STATES PATENTS

| Re. 25,532 | 3/1964 | Asman | 229—17 |
| 2,509,447 | 5/1950 | Prawdzik | 206—46 |
| 2,925,948 | 2/1960 | Alden | 229—17 |
| 3,028,952 | 4/1962 | Milio et al. | 229—51 X |
| 3,107,839 | 10/1963 | Kauffeld | 229—17 |

JOSEPH R. LECLAIR, Primary Examiner.

GEORGE O. RALSTON, Examiner.

D. T. MOORHEAD, Assistant Examiner.